(12) United States Patent
Fresnel

(10) Patent No.: US 11,090,875 B2
(45) Date of Patent: Aug. 17, 2021

(54) DEVICE FOR CONNECTING SHEATHS TOGETHER BY APPLYING ADHESIVE INTERNALLY, A CORRESPONDING ROLL OF ADHESIVE, AND A CORRESPONDING METHOD OF CONNECTION

(71) Applicant: SLEEVER INTERNATIONAL COMPANY, Morangis (FR)

(72) Inventor: Eric Fresnel, Paris (FR)

(73) Assignee: SLEEVER INTERNATIONAL COMPANY, Morangis (FR)

( * ) Notice: Subject to any disclaimer, the term of this patent is extended or adjusted under 35 U.S.C. 154(b) by 82 days.

(21) Appl. No.: 16/037,501

(22) Filed: Jul. 17, 2018

(65) Prior Publication Data
US 2019/0022955 A1 Jan. 24, 2019

(30) Foreign Application Priority Data
Jul. 18, 2017 (FR) .................................... 17 56808

(51) Int. Cl.
*B29C 65/48* (2006.01)
*B29C 65/00* (2006.01)
(Continued)

(52) U.S. Cl.
CPC .......... *B29C 65/48* (2013.01); *B29C 65/5021* (2013.01); *B29C 65/5057* (2013.01); *B29C 65/74* (2013.01); *B29C 65/7802* (2013.01); *B29C 65/7847* (2013.01); *B29C 66/02241* (2013.01); *B29C 66/1122* (2013.01); *B29C 66/522* (2013.01); *B29C 66/5221* (2013.01); *B29C 66/853* (2013.01); *B65H 19/102* (2013.01); *B65H 19/1826* (2013.01); *B65H 21/00* (2013.01); *C08L 101/00* (2013.01); *C09J 7/00* (2013.01); *B29C 66/73715* (2013.01); *B29C 66/98* (2013.01); *B29C 2793/0081* (2013.01); *B29L 2023/001* (2013.01);
(Continued)

(58) Field of Classification Search
CPC ............ B29C 65/7802; B29C 65/7847; B29C 66/1122; B29C 66/1142; B29C 66/522; B29C 66/5221; B65H 19/102; B65H 19/1826; B65H 21/00; B65H 2301/4621
USPC ................................ 156/502, 503, 505, 506
See application file for complete search history.

(56) References Cited

U.S. PATENT DOCUMENTS

2009/0133821 A1* 5/2009 Ederer .............. B29C 66/83411
156/258
2015/0047772 A1* 2/2015 Van Heck ........... B29C 66/8221
156/158

FOREIGN PATENT DOCUMENTS

EP 2825370 A1 1/2015
FR 2880329 A1 7/2006
(Continued)

*Primary Examiner* — Carson Gross
(74) *Attorney, Agent, or Firm* — Muncy, Geissler, Olds & Lowe, P.C.

(57) ABSTRACT

The invention provides a device for connecting together two flat tubular sheaths, the device including:
- a blocker (22a, 22b, 22c, 22d) for blocking one end of a first sheath, the blocker having means for opening an end of the first sheath;
- an adhesive-applicator system for applying adhesive to the inside of the open end of the sheath;
- the blocker being arranged to authorize closure of the end of the first sheath, once adhesive has been applied thereto, on an end of the second sheath.

The invention also provides a corresponding roll of adhesive and a corresponding connection method.

20 Claims, 13 Drawing Sheets

(51) Int. Cl.
- *B29C 65/50* (2006.01)
- *B29C 65/78* (2006.01)
- *B65H 19/10* (2006.01)
- *C09J 7/00* (2018.01)
- *B65H 19/18* (2006.01)
- *C08L 101/00* (2006.01)
- *B65H 21/00* (2006.01)
- *B29C 65/74* (2006.01)
- *B29L 31/00* (2006.01)
- *B29L 23/00* (2006.01)

(52) U.S. Cl.
CPC .............. *B29L 2031/744* (2013.01); *B65H 2301/46015* (2013.01); *B65H 2301/4621* (2013.01); *B65H 2301/4633* (2013.01); *B65H 2701/332* (2013.01); *C09J 2301/124* (2020.08); *C09J 2301/204* (2020.08)

(56) References Cited

FOREIGN PATENT DOCUMENTS

| WO | WO-2017025218 A1 | * | 2/2017 | ......... B29C 65/7847 |
| WO | WO2017025218 A1 | | 2/2017 | |

\* cited by examiner

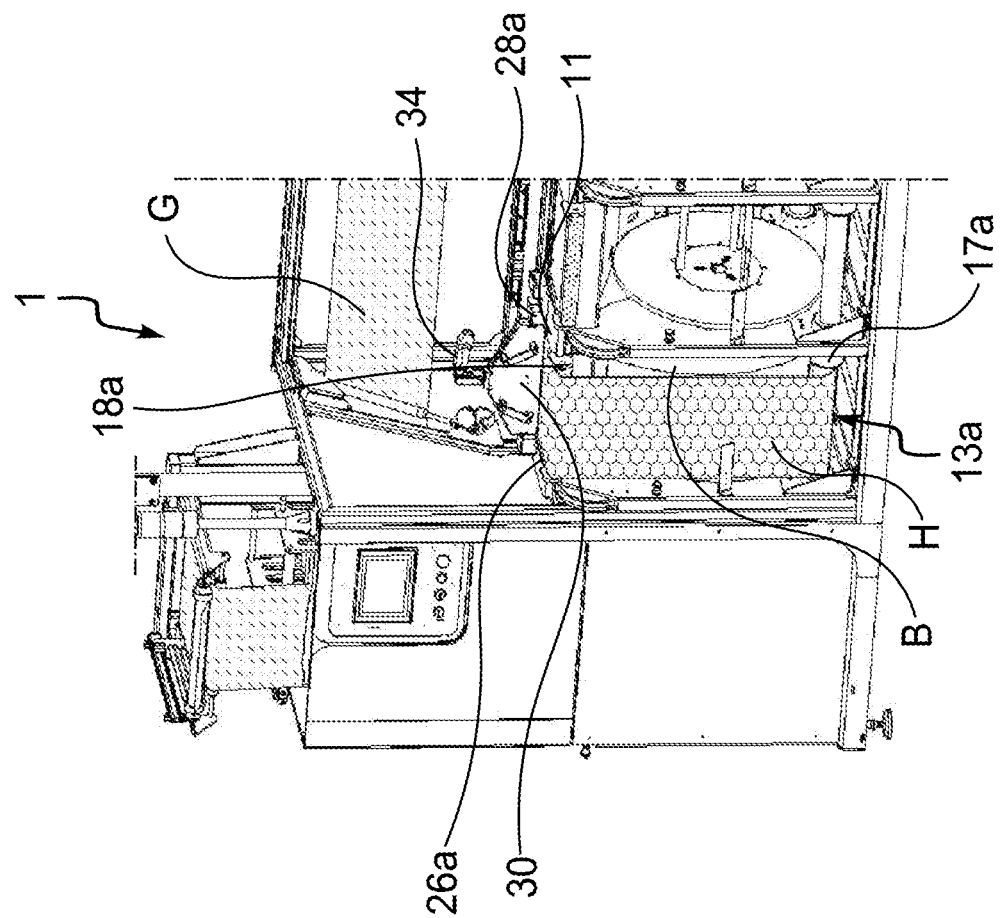

DEVICE FOR CONNECTING SHEATHS TOGETHER BY APPLYING ADHESIVE INTERNALLY, A CORRESPONDING ROLL OF ADHESIVE, AND A CORRESPONDING METHOD OF CONNECTION

The invention relates to a device for connecting together two flattened tubular sheaths by applying adhesive to the inside of the end of one of the two sheaths.

The invention also provides a corresponding roll of adhesive and a corresponding method of connection.

TECHNOLOGICAL BACKGROUND OF THE INVENTION

In the field of placing sleeves, (e.g. heat-shrink sleeves) on traveling objects, the sleeves are generally obtained by being cut from a tubular sheath that is packaged in a flat state in the form of a reel and then opened by a shaper prior to being cut transversely.

Given the throughput rates of machines for placing sleeves on traveling objects, the problem of changing reel arises repeatedly, each time a reel is used up.

In relatively old techniques, two reels were connected together manually.

Nevertheless, that can hardly be envisaged any more with the very high throughput rates of machines for placing sleeves on traveling objects.

More recently, attempts have been made to automate the process of connecting sheaths together.

Proposals have thus been made to connect together the two ends of two flat tubular sheaths by arranging those two ends so that the free edges of the two ends of the sheaths are facing each other and touching, but without overlapping, and by applying an adhesive element across said sheath ends in order to make the junction.

In this context, reference may be made to patent FR 2 880 329 in the name of the present Applicant, which describes such a method.

Reference may also be made to patent EP 2 825 370 in the name of Fuji Seal International that also proposes outside connection of two ends of two flat tubular sheaths. By means of a complex succession of numerous movements, the machine described in that patent makes it possible to arrange the end of one of the sheaths relative to the end of the other sheath prior to connecting together the two ends on the outside by adhesive.

OBJECT OF THE INVENTION

The invention seeks to propose a sheath connection device that makes it easier to connect said sheaths together. The invention also seeks to provide a roll of adhesive and a corresponding method of connection.

SUMMARY OF THE INVENTION

In order to achieve this object, there is provided a device for connecting together two flat tubular sheaths, the device including:
a blocker for blocking one end of a first sheath, the blocker having opener for opening an end of the first sheath; and
an adhesive applicator system for applying adhesive to the inside of the open end of the sheath;
the blocker being arranged, once adhesive has been applied to the end of the first sheath, to authorize closure of the end of the first sheath on an end of the second sheath.

Thus, the connection between the two sheaths is provided by applying adhesive to the inside of the end of one of the two sheaths, which end is then closed onto the end of the other sheath.

The sheaths can thus be connected together quickly and relatively easily since there is no need to make the two ends of the two sheaths touch each other in a manner that is as accurate as in the prior art.

In particular manner, the adhesive applicator system includes an adhesive dispenser.

In particular manner, the device includes a frame, the blocker being arranged on the frame.

In particular manner, the device includes a carriage for moving an end of the second sheath relative to the first sheath.

In particular manner, the carriage includes a base for supporting the second sheath, the base being arranged in the device in such a manner as to be movable in translation relative to a frame of the device with movement in translation only.

In particular manner, the carriage carries the adhesive applicator system in order to apply adhesive to the end of the first sheath.

In particular manner, the carriage has two adhesive applicator systems arranged at opposite ends of the carriage.

In particular manner, the carriage includes an extension carrying a motor-driven drive wheel, the carriage is thus arranged in such a manner that when the carriage is in register with one of the blockers, the drive wheel is situated in register with a reel formed by the sheath so as to be able to drive the reel in rotation either directly or via an element constrained to rotate with the reel.

In particular manner, the carriage includes means for preparing the end of the second sheath.

In particular manner, the means for preparing the end of the second sheath include a cutter member for cutting the end of the second sheath.

In particular manner, the means for preparing the end of the second sheath include a strip movably mounted on the carriage to move between a lowered position in which the strip lies substantially extending the remainder of the carriage and a raised position in which the strip extends transversely towards the ceiling of the device.

In particular manner, the strip is shaped as a suction bar.

In particular manner, the opener includes two suction bars arranged one above the other and between which the end of the first sheath is to be inserted.

In particular manner, each of the two suction bars is movably mounted relative to a frame of the device to move between:
  a closing position in which the two bars are arranged so that the suction holes in one of the bars face the suction holes in the other bar; and
  a blocking position in which the two bars are arranged so that the suction holes of both of the bars are oriented towards the outside of the blocker.

In particular manner, at least one of the bars is also mounted to move relative to the frame with additional movement so as to be movable between:
  a spaced-apart position in which said bar is offset from the other bar; and
  the standby position in which the two suction bars are placed one against the other.

In particular manner, the device further includes a cutter appliance for preparing the end of the first sheath, the cutter appliance including snap-fastener means suitable for co-operating with corresponding snap-fastener means of a frame of the device.

In particular manner, the cutter appliance includes a slot and a movable blade that is movable relative to said slot, the slot being arranged in such a manner as to present a rectilinear central portion that is extended at both ends by symmetrical steps.

In particular manner, a frame of the device includes a magazine for storing reels, the magazine having drawers mounted to slide relative to the frame and each carrying one reel.

The invention also provides a roll of adhesive comprising a support ribbon and a double-sided adhesive carried by the support ribbon, the adhesive being precut at regular intervals along the length of the roll of adhesive.

In particular manner, the support ribbon comprises a central zone without adhesive and two margin zones covered in the double-sided adhesive and on either side of said central zone.

In particular manner, the adhesive includes a succession of markers arranged at regular intervals along the length of the roll of adhesive in order to detect a connection between two flat tubular sheaths.

In particular manner, the markers are elements made of metal material.

The invention also provides a method of connecting together two flat tubular sheaths, the method comprising the following successive steps:

blocking one end of a first sheath;
 opening the end of the first sheath;
 applying adhesive to the inside of the end of the first sheath; and
 closing the end of the first sheath on an end of the second sheath.

Other characteristics and advantages of the invention appear on reading the following description of a particular, non-limiting embodiment of the invention.

DESCRIPTION OF THE FIGURES

The invention can be better understood in the light of the following description given with reference to the figures of the accompanying drawings, in which:

FIGS. 9a to 9i are diagrams shown the various steps of connecting together two sheaths using the device shown in FIG. 2.

DETAILED DESCRIPTION OF A PARTICULAR EMBODIMENT OF THE INVENTION

Figure 1:
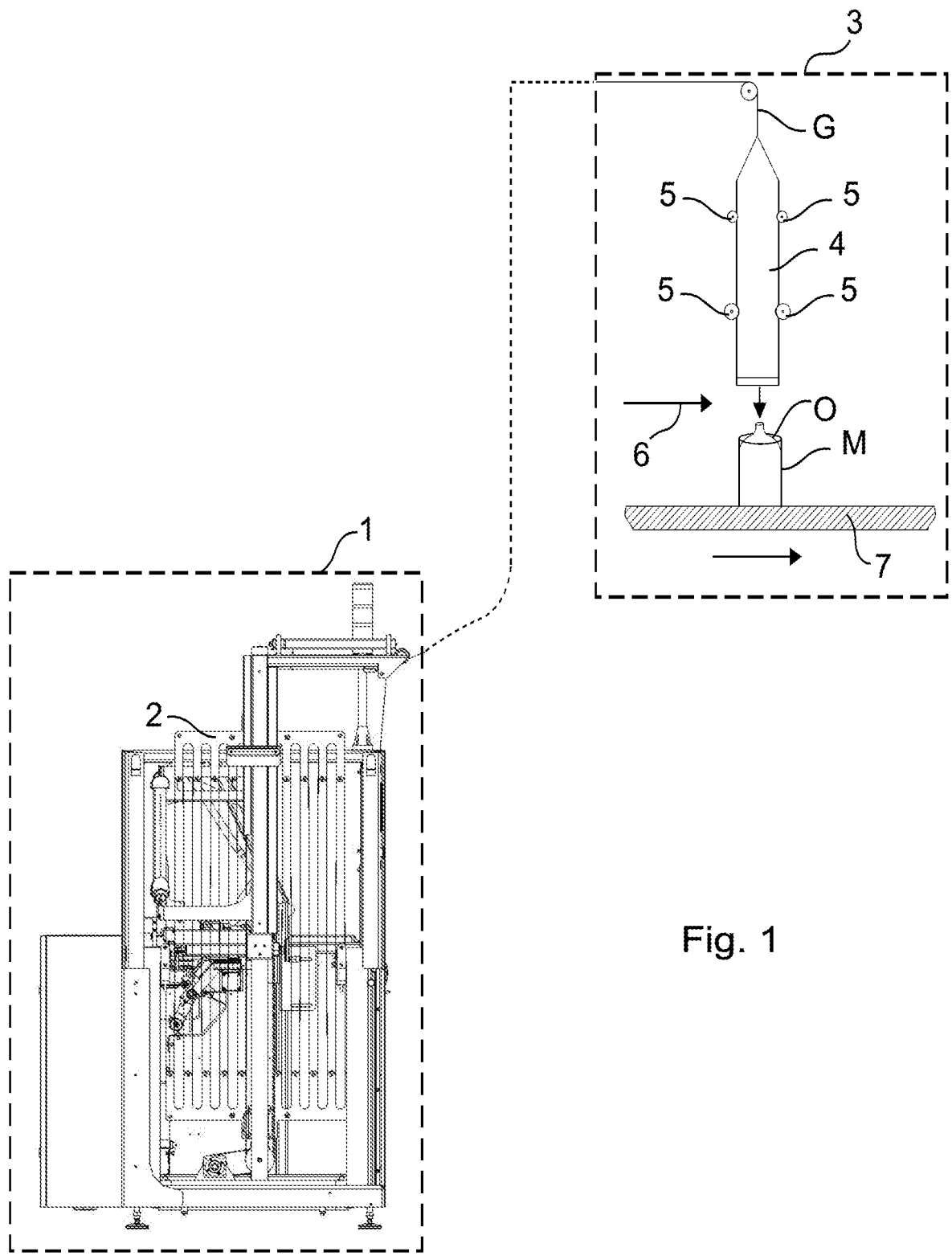
FIG. 1 is a diagram of an installation for placing sleeves on traveling objects, the installation including a connection device in a particular embodiment of the invention.
Figure 2:
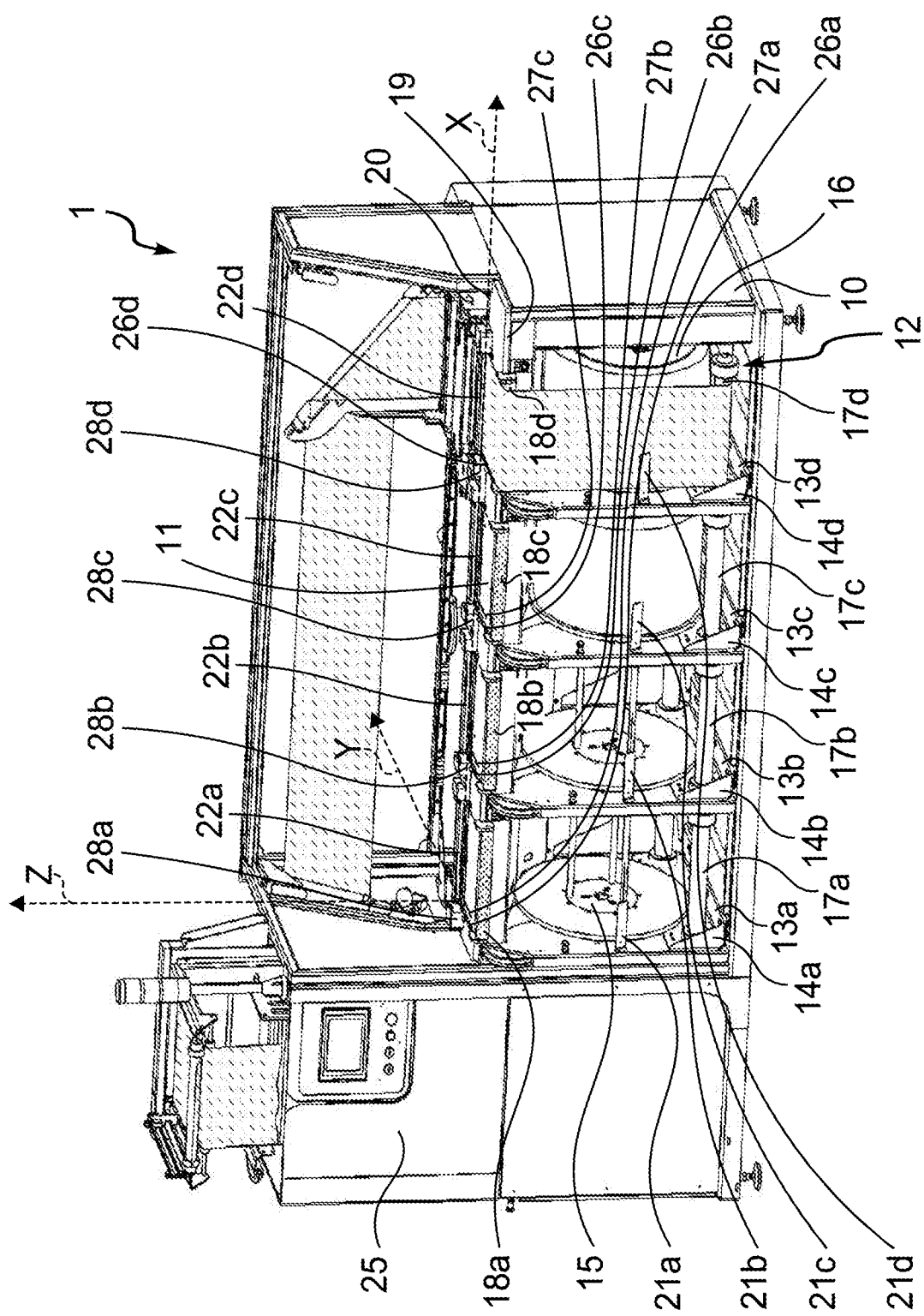
FIG. 2 is a three-dimensional view of the connection device of the installation shown diagrammatically in FIG. 1.

With reference to FIG. 1, the installation for placing sleeves on traveling objects includes a connection device for connecting together flat tubular sheaths in a particular embodiment of the invention, the device being given an overall reference 1, the installation also including a machine 3 for preparing and cutting sheaths in order to form sleeves M that are subsequently placed on traveling objects O, said machine 3 being downstream from the device. The sheaths are typically made of heat-shrink material.

The machine 3 includes a shaper 4 that is typically in the form of a vertical axis torpedo, that is held by facing pairs of wheels 5, some of which are motor driven.

The sheath G that has traveled from the device 1 to the shaper 4 in its flat tubular form becomes progressively opened on reaching the top of the shaper 4. Thereafter, the sheath G passes between the shaper and the wheels 5, the shaper 4 thus remaining suspended in the air as the now cylindrically opened sheath G travels along its wall.

Immediately downstream from the shaper 4, the sheath G is subjected to a cutting operation by means of a cutter tool represented herein by an arrow 6, thereby producing sleeves M that are thus put into place directly on the objects of arranged on a conveyor 7 traveling under the shaper 4.

The machine 3 and the connection between the device 1 and the machine 3 are themselves well known, so they are not described in greater detail herein.

Attention is now given to the device 1 and to the question of connecting sheaths together that arises each time a reel that is being used comes to an end, the sheaths in this example being packaged in the form of reels.

Thus, with reference to FIGS. 2 to 8, the device 1 comprises a frame 10 extending longitudinally along a first axis X. The frame 10 includes a connection table 11 extending in a plane containing the first axis X and a transverse second axis Y that is perpendicular to the first axis X. The frame 10 is shaped in such a manner that said plane extends substantially parallel to the ground on which the frame stands. The frame 10 thus has a defined height up a substantially vertical third axis Z that is perpendicular to the first and second axes X and Y.

The frame 10 includes a reel storage magazine 12 that is arranged under the connection table 11. By way of example, the magazine 12 is shaped so as to receive four reels. This example is naturally not limiting and the magazine 12 may be shaped to receive some other number of reels.

In particular manner, the magazine 12 is shaped so as to present four compartments 13a, 13b, 13c, 13d each receiving a respective reel. The compartments 13a, 13b, 13c, 13d are juxtaposed and thus extend one after another along the first axis X.

Preferably, each compartment 13a, 13b, 13c, 13d includes a drawer 14a, 14b, 14c, 14d that is mounted to slide in the associated compartment and that carries the associated reel. By way of example, each drawer 14a, 14b, 14c, 14d is mounted to slide in the associated compartment along a sliding axis parallel to the second axis Y.

As a result, it is easier for an operator to refill the magazine 12.

Typically, each drawer 14a, 14b, 14c, 14d has a spindle 15 (only one of which is referenced) on which a reel is mounted so that it can be unwound around the axis of said spindle. The spindles of the magazine 12 are arranged so that their axes extend parallel to the first axis X.

Specifically, the various reels are arranged in the magazine 12 one after another along the first axis X and in such a manner as to be unreeled about the axes of the spindles parallel to said first axis X.

In order to limit unwanted movement of each reel along the axis of the associated spindle, each drawer 14a, 14b, 14c, and 14d includes a disk 16 (only one of which is referenced) placed on the corresponding spindle once the reel is in place thereon, with the disk 16 being stationary relative to the spindle for movement in translation along its axis.

The frame 10 also has deflector rollers associated with each of the compartments 13a, 13b, 13c, 13d so as to bring each reel from its compartment to the connection table 11.

In a particular embodiment, for each compartment 13a, 13b, 13c, 13d, a first roller (not shown) is arranged in the bottom portion of the compartment, at the bottom of the compartment, a second roller 17a, 17b, 17c, 17d is arranged in the bottom portion of the corresponding compartment 13a, 13b, 13c, 13d, and at the end of said compartment, and a third roller 18a, 18b, 18c, 18d is arranged in the top portion of the corresponding compartment 13a, 13b, 13c, 13d, and at the end of said compartment so as to overlie the second roller 17a, 17b, 17c, 17d and so as to be substantially level with the boundary with a first longitudinal edge 19 of the connection table 11.

As a result, the sheath is unreeled from the reel to the first roller and then travels from the first roller to the second roller (e.g. 17d) substantially horizontally towards the outside of the compartment (13d) and the outside of the device 1, and then travels from the second roller (17d) to the third roller (18d) so as to rise substantially vertically to the connection table 11, and then extend from the third roller 18d to the second longitudinal edge 20 of the connection table 11 (opposite from the above-mentioned first longitudinal edge 19) substantially horizontally, and thus parallel to the connection table 11.

Each compartment 13a, 13b, 13c, 13d preferably includes an arm 21a, 21b, 21c, 21d carrying a sensor (not shown) for detecting the end of the associated reel. Typically, the sensor detects the presence of a marker that is arranged on the end of a reel.

Thus, each arm 21a, 21b, 21c, 21d extends in the associated compartment parallel to the first axis X substantially at the edge of said compartment so as to face the associated sheath as it rises vertically between the second and third associated rollers.

Furthermore, the frame 10 includes a blocker for blocking the initial ends of the various sheaths present in the magazine 12.

Preferably, the frame 10 includes as many blockers 22a, 22b, 22c, 22d as there are compartments 13a, 13b, 13c, 13d in the magazine 12 so that each initial sheath end is blocked by a dedicated blocker.

The various blockers 22a, 22b, 22c, 22d are all arranged in this example at the second longitudinal edge 20 of the connection table 11, i.e. where the various initial ends of the reels arrive. Each blocker 22a, 22b, 22c, 22d thus extends facing the third associated deflector roller 18a, 18b, 18c, 18d.

Each blocker 22a, 22b, 22c, 22d includes opener (i.e. means for opening) the initial end of the associated sheath.

Since all of the blockers 22a, 22b, 22c, 22d are identical, only the opening means of one of them are described below. The description naturally applies equally well to the other opening means.

The opening means thus comprise two suction bars 23 and 24. Each bar 23, 24 extends longitudinally parallel to the first axis X, with the two bars being arranged one above the other.

By way of example, the suction bars 23 and 24 are connected to a common vacuum pump (not shown) of the device 1, the vacuum pump typically being arranged in the bottom portion of the frame 10, behind the magazine 12.

Figure 3:
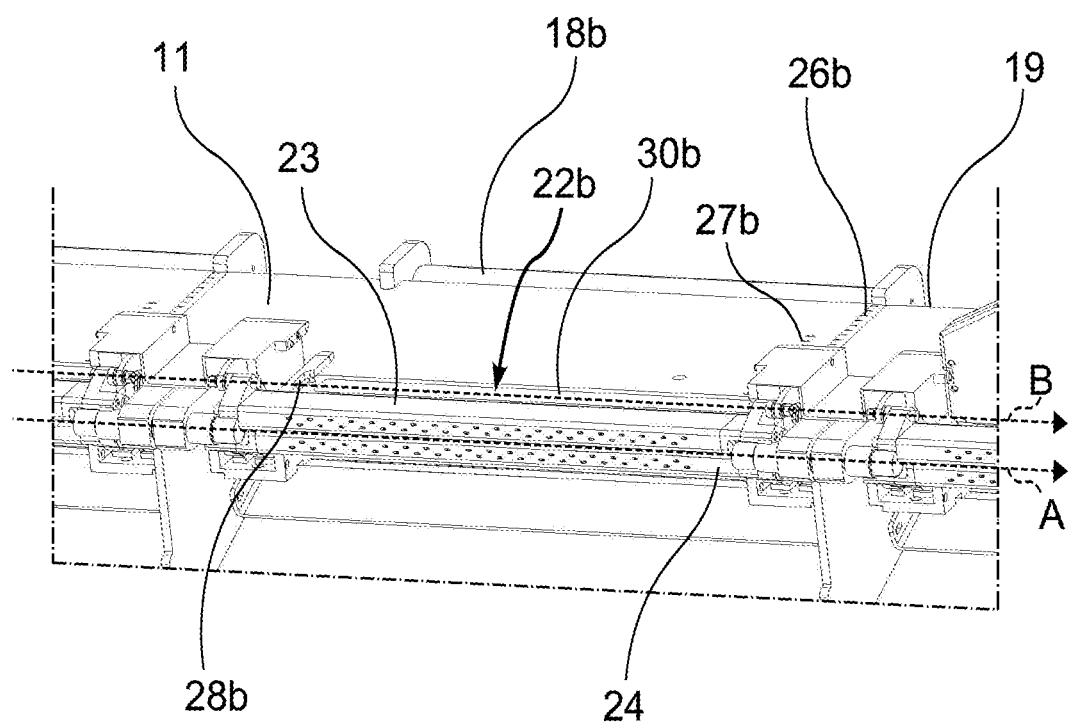
FIG. 3 is an enlarged view of a portion of the frame of the device shown in FIG. 2, showing in particular the blockers of said device.

The two suction bars 23, 24 of said opening means in this example are each mounted to move on the connection table 11 between:
- a closing position in which the two bars 23, 24 are arranged so that the suction holes in one of the bars face the suction holes in the other bar; and
- a blocking position (as shown in FIG. 3) in which the two bars 23, 24 are arranged so that the suction holes in both bars 23 and 24 are oriented towards the outside of the connection table 11 (and thus away from the first longitudinal edge 19).

The two suction bars 23 and 24 are typically mounted to pivot on the connection table 11 about a common pivot axis A that is parallel to the first axis X.

In particular manner, the top suction bar 23 is also mounted to move on the connection table 11 with an additional movement so as to be movable between:
- a spaced-apart position in which the top suction bar 23 is spaced apart from the bottom suction bar 24, at least in a direction parallel to the third axis Z; and
- a standby position (in which the two suction bars 23, 24 are placed one against the other).

By way of example, this additional movement is provided by additional turning of the top suction bar 23 on the connection table 11 about a pivot axis B that is parallel to the first axis X.

Typically, the turning movement about the pivot axis A of the two suction bars 23 and 24 is motor driven and controlled automatically by the device 1. In contrast, the additional turning movement of the top suction bar 23 about the pivot axis X is not motor driven; an operator causes it to move between the spaced-apart position and the standby position by hand so as to make it easier to insert an initial sheath end between the two suction bars 23, 24 while preparing a new reel.

The device 1 includes a control member 25 for controlling the various elements of the device 1, such as for example the various blockers 22a, 22b, 22c, 22d. In particular, said control member 25 controls the motor drive of the pairs of suction bars 23, 24 of the various blockers 22a, 22b, 22c, 22d and the connection of the vacuum pump to the suction bars 23, 24. The sensors for detecting the ends of reels are also connected to the control member 25.

In a preferred embodiment, the frame 10 includes rules 26a, 26b, 26c, 26d. Each blocker 22a, 22b, 22c, 22d is associated with a respective rule 26a, 26b, 26c, 26d, each rule 26a, 26b, 26c, 26d extends between the blocker 22a, 22b, 22c, 22d and the associated third deflector roller 18a, 18b, 18c, 18d. Each rule 26a, 26b, 26c, 26d thus extends on the connection table parallel to the second axis Y.

This makes it possible to cause one of the longitudinal edges of the sheath to contact the associated rule in order to guide the travel of the sheath. As a result, the sheath is placed in a predetermined position along the second axis Y, thus making it easier to connect it with the old sheath.

Preferably, each rule 26a, 26b, 26c, 26d has measurement graduations making it easier to position the associated sheath relative to the second longitudinal edge 20 of the connection table 11.

In particular manner, the connection table 11 also has measurement graduations 27a, 27b, 27c, 27d that are arranged on the connection table 11, specifically along each rule 26a, 26b, 26c, 26d so as to also make it easier to position the respective associated sheath relative to the second longitudinal edge 20 of the connection table 11.

In a preferred embodiment, the device 1 includes a cutter appliance 30 for cutting the initial ends of new reels in predetermined manner for connection.

Advantageously, the cutter appliance 30 is shaped to be able to be moved relative to the connection table 11 into the vicinity of each blocker 22a, 22b, 22c, 22d. For this purpose, the frame 10 includes snap-fastener means 28a, 28b, 28c, 28d in association with each blocker 22a, 22b, 22c, 22d that are suitable for co-operating with corresponding snap-fastener means 31 of the cutter appliance 30.

As a result, it suffices to release the cutter appliance 30 from one of the blockers and to snap-fasten it to another blocker in order to cut a new initial end of a sheath.

Advantageously, when having different dimensions sheaths, it suffices to associate a new cutter appliance to the frame 10 without any need to modify the entire frame 10.

Preferably, the connection table 11 includes protection mats 29a, 29b, 29c, 29d in association with the various snap-fastener means 28a, 28b, 28c, 28d of the frame 10. Each protection mat 29a, 29b, 29c, 29d thus extends parallel to the first axis X on the connection table 11 in the vicinity of the corresponding snap-fastener means 28a, 28b, 28c, 28d. By way of example, each protection mat 29a, 29b, 29c, 29d may be made of rubber material.

Thus, when the cutter appliance 30 is snap-fastened to one of the blockers, a bottom face 33 of the cutter appliance 30 rests on the protection mat associated with the blocker, whereby the associated protection mat protects the connection table 11 from a blade of the cutter appliance 30 while cutting the initial sheath end.

Furthermore, each protection mat 29a, 29b, 29c, 29d also advantageously serves as a marker for facilitating positioning the sheath relative to the second longitudinal edge 20 of the connection table 11.

Figure 6:
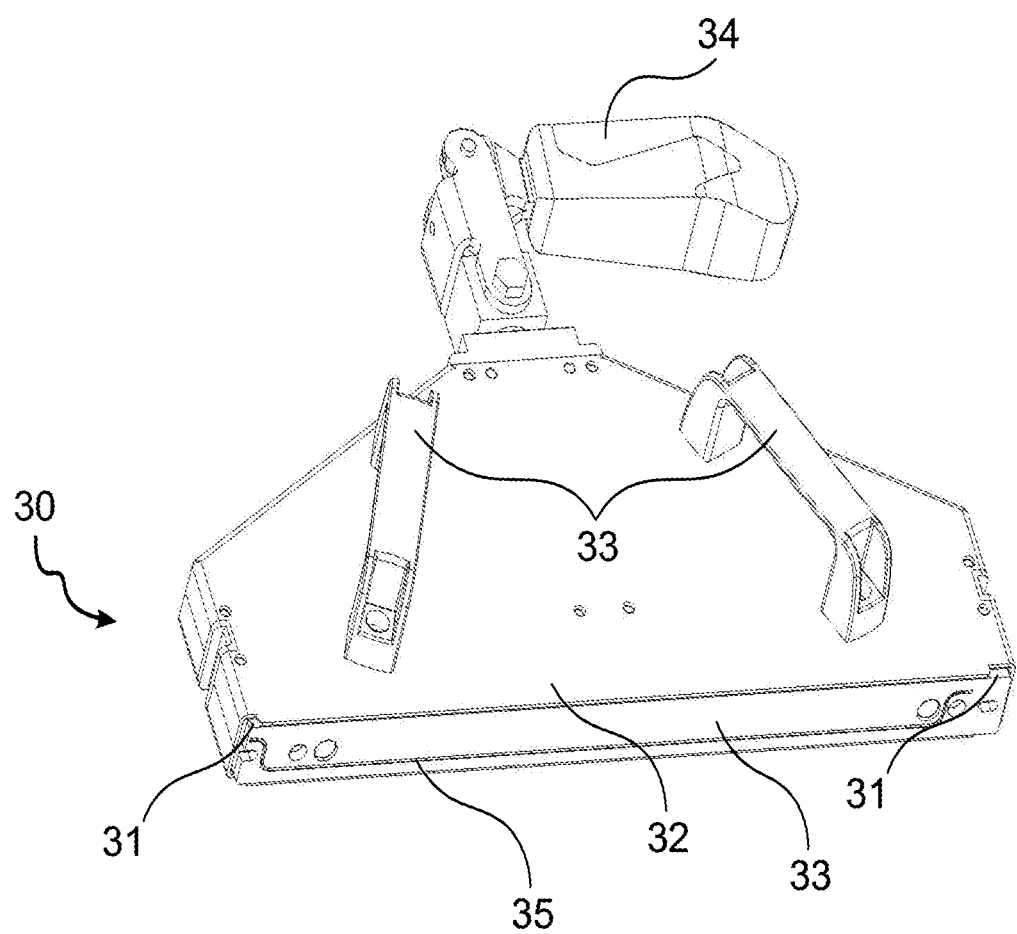
FIG. 6 is a three-dimensional view of a cutter appliance for cutting the ends of sheaths arranged in the device shown in FIG. 2.

With reference to FIG. 6, the cutter appliance 30 comprises more particularly a substantially plane body 32 and two handles 33 for manipulating the body 32 so as to make it easier to move the cutter appliance 30 and attach it temporarily to the various snap-fastener means 28a, 28b, 28c, 28d of the frame 10.

The cutter appliance 30 also has a blade mounted to slide in the cutter appliance 30 between a low position in which the blade projects from a slot 35 formed in the bottom face 33 of the cutter appliance 30 and a high position in which the blade does not project from said slot 35.

The cutter appliance 30 has an additional handle 34 for manually actuating the blade between its high position and its low position for cutting the initial ends of the sheaths.

Alternatively, the blade of the cutter appliance 30 may be arranged so that the additional handle 34 causes the blade to move in translation along the slot 35 in order to travel along the entire path defined by the slot 35 instead of performing the above-mentioned downward movement.

In particular manner, the slot 35 of the cutter appliance 30 is not completely rectilinear. In this example, the slot 35 is arranged so as to present a central portion that is rectilinear and that is extended at both ends by symmetrical steps that are substantially L-shaped.

More precisely, each step comprises in succession:
- a convex circularly arcuate portion connected to the central portion;
- a rectilinear portion connected to the convex circularly arcuate portion, the rectilinear portion being substantially perpendicular to the central portion;
- a concave circularly arcuate portion connected to the rectilinear portion; and
- a rectilinear portion connected to the concave circularly arcuate portion, said rectilinear portion being parallel to the central portion and being shorter in length than the length of the central portion.

Figure 7:
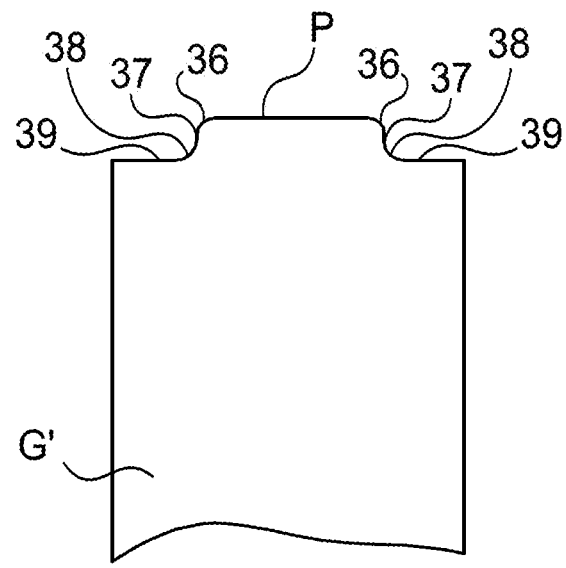
FIG. 7 is a diagrammatic view of a sheath end after it has been cut by the cutter appliance shown in FIG. 6.

As a result, and as can be seen in FIG. 7, the initial end of a sheath G' as cut in this way is not rectilinear, but presents two setbacks.

More precisely, the slot 35 is shaped in such a manner that each setback includes in succession:
- a convex circularly arcuate portion 36 connected to the rectilinear central portion P of the sheath G';
- a rectilinear portion 37 connected to the convex circularly arcuate portion 36, the rectilinear portion 37 being substantially perpendicular to the central portion P;
- a concave circularly arcuate portion 38 connected to the rectilinear portion 37; and
- a rectilinear portion 39 connected to the concave circularly arcuate portion 38, said rectilinear portion 39 being parallel to the central portion P and being of length shorter than the length of the central portion P.

Said initial end of the sheath thus has two lips (extending one against the other as a result of the sheath being of flat shape) extending the remainder of the sheath G' and terminating in the rectilinear central portion P of the sheath G'.

The particular shape of the cutting at the initial end of the sheaths makes connection with the terminal end of the reel that is being unreeled easier, as explained below.

Preferably, the device 1 has a carriage 40 that makes it possible to bring the terminal end of the old sheath so that it faces the initial end of a new sheath.

In this example, the carriage 40 is mounted to slide on the frame 10 along the first axis X facing the second longitudinal edge 20 of the connection table 11. The carriage 40 is thus arranged so as to be capable of being brought to each blocker 22a, 22b, 22c, 22d of the frame 10. By way of example, the frame 10 has rails extending parallel to the first axis X and in the immediate proximity of the second longitudinal edge 20, with the carriage 40 being mounted to slide between the rails along the first axis X.

The control member 25 is also arranged to control the various elements of the carriage 40 and the movement in translation of the carriage 40 along the first axis X.

The carriage 40 is described below.

The carriage 40 thus comprises a base 41 having a first longitudinal edge (not referenced) and a second longitudinal edge 43 opposite from the first longitudinal edge and facing the second longitudinal edge 20 of the connection table 11.

The carriage 40 also has a stand 42 extending substantially perpendicularly to the base 41 towards the ceiling of the device 1, at the first longitudinal edge of the base 41.

The carriage 40 typically includes a drive roller 44 for driving the sheath to be unreeled. The drive roller 44 is thus motor driven and controlled by the control member 25.

Said drive roller 44 is mounted on the base 41 so as to extend parallel to the first axis X over the entire length of the base 41. The drive roller 44 is also arranged in the carriage 40 substantially at the junction between the base 41 and the stand 42. The drive roller 44 is naturally mounted to rotate on the carriage 40 about an axis of rotation parallel to the first axis X.

The carriage 40 preferably includes other rollers for facilitating unreeling of the sheath. In this example, these other rollers are not motor driven.

In particular manner, the carriage 40 includes a first secondary roller 45 (visible only in FIG. 9e) that is arranged so as to extend parallel to the first axis X and that is mounted to rotate parallel to the first axis X, the first secondary roller 45 being mounted on the base 41 between the drive roller 44 and the second longitudinal edge 43 of the base 41.

The carriage 40 preferably also includes a carousel 46 of secondary rollers and backing rollers together forming a circular arc, the various rollers and backing rollers all extending parallel to the first axis X and all being mounted to rotate parallel to the first axis X on the base 41. In this example, the carousel 46 is arranged between the first secondary roller 45 and the drive roller 44.

As a result, the sheath for unreeling extends from the connection table 11 to the carousel 46 substantially horizontally and from the carousel to the drive roller 44, horizontally once more.

The stand 42 preferably has a deflector roller 48 extending transversely to the stand 42 at the top portion of the stand 42 along an axis E. In this example, the deflector roller 48 lies in a vertical plane, but it extends obliquely relative to the first axis X and to the third axis Z. Typically, the deflector roller 48 extends at about 45 degrees to the first axis X and at about 45 degrees to the third axis Z. The deflector roller 48 is not motor driven.

As a result, the sheath extends from the drive roller 44 of the carriage 40 substantially vertically towards the ceiling of the device 1 (substantially parallel to the stand 42), and then extends from the deflector roller 48 towards the outside of the device 1 in a plane that is normal to the second axis Y. The deflector roller 48 thus makes it possible to change the travel direction of the sheath in order to make it easier to extract it from the device 1.

Naturally, depending on the remainder of the installation (e.g. the relative position of the device 1 and the machine 3), the device 1 may include a plurality of other optionally motor-driven rollers in order to change the orientation and/or the travel direction of the sheath so as to ensure good tension between the sheath going towards the outlet of the device 1. Since these means are well known from elsewhere, they are not described in greater detail herein.

At the outlet from the device 1, the device includes an accumulator 2 through which the sheath passes prior to reaching the machine 3.

In a particular embodiment, the carriage 40 has an extension 49 extending towards the floor of the frame 10, the extension itself carrying a motor-driven drive wheel 50. The carriage 40 is thus arranged so that when the carriage 40 is at one of the blockers, the drive wheel 50 is situated in the compartment of the reel under consideration so as to be able to drive the reel directly in rotation or so as to be able to drive an element of the compartment that is constrained to rotate with the reel, such as for example the disk 16 arranged on the spindle once the reel has been put into place on the spindle.

This makes it easier to unreel the sheath.

In addition to or as a replacement for the detection sensors on the arms 22a, 22b, 22c, 22d, the carriage 40 may include a detection sensor for detecting the end of a reel (not shown), which sensor is connected to the control member 25. The sensor typically detects the presence of a marker arranged on the end of a reel and when this information is communicated to the control member 25 that triggers a process for connecting a new reel. The sensor is thus arranged on the carriage 40 on the path followed by the sheath in the carriage 40 so as to overlie said sheath. By way of example, the sensor is carried by a rod extending over the secondary rollers and backing rollers of the carriage 40.

At the second longitudinal edge 43 of the base 41, the carriage 40 includes means for preparing the terminal end of the sheath that is being unreeled in order to enable it to be connected to a new sheath.

Said means include a cutter member 51 for cutting the end of the sheath that is being unreeled.

For this purpose, the cutter member 51 has a first strip 52 arranged in the carriage 40 so as to extend along an axis C that is parallel to the first axis X over the entire length of the base 41.

Figure 4:
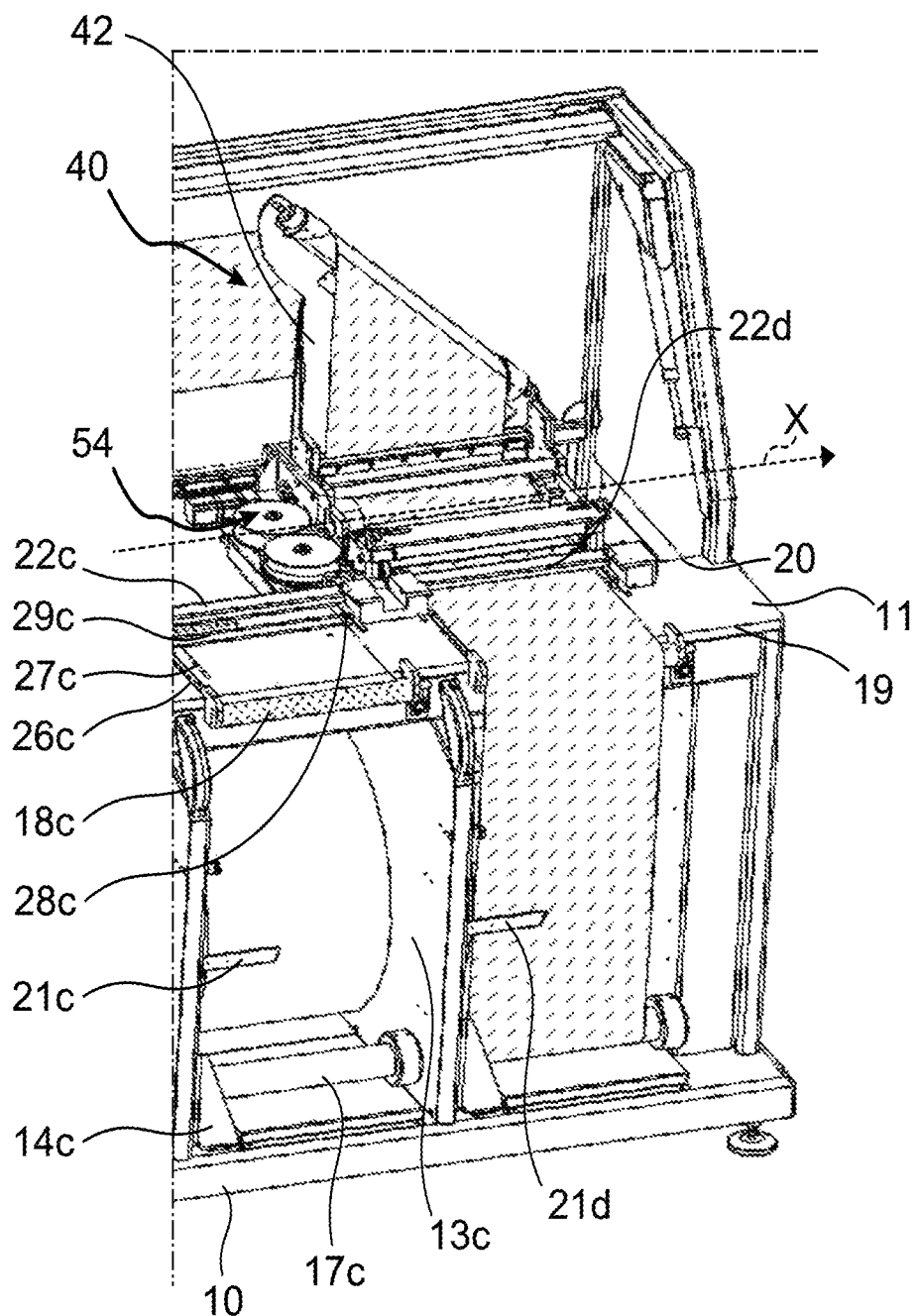
FIG. 4 is an enlarged view of a portion of the device shown in FIG. 2, including in particular the carriage of said device.
Figure 5:
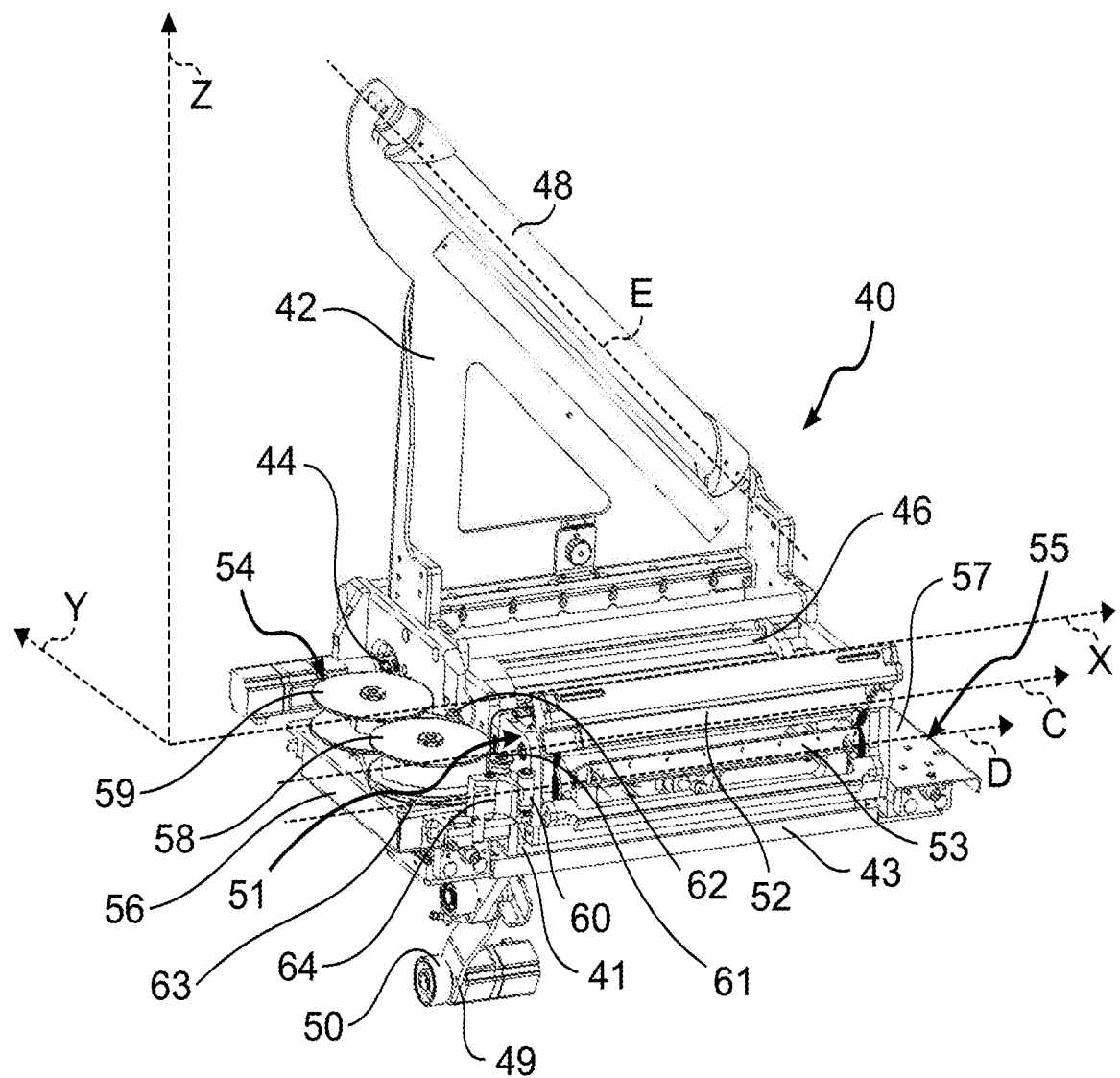
FIG. 5 is a three-dimensional view of the carriage of the device shown in FIG. 2, with only a portion of a second adhesive applicator system of the carriage being shown in this figure.

The first strip 52 is pivotally mounted on the carriage to pivot between an active position in which the first strip 52 is in contact with the sheath and a passive position in which the first strip 52 is offset from said sheath (as shown in FIG. 4). The first strip 52 may for example be mounted to move between the active position and the passive position on the carriage 40 by pivoting about an axis C.

The first strip 52 is provided with a blade (not referenced) that is mounted to slide in the first strip 52 along the axis C. The first strip 52 preferably further includes blade actuator means for causing the blade to move automatically along the axis C. By way of example, the actuator means comprise an actuator for driving the blade. The control member 25 controls the pivoting movement of the first strip 52 about the axis X and also the movement in translation of the blade. Alternatively, the blade may be arranged in such a manner that the associated actuator means cause the blade to move downwards in translation and not along the axis C as stated above.

Furthermore, the means for preparing the terminal end of the sheath include a second strip 53 arranged so as to extend along an axis D parallel to the first axis X over the entire length of the base 41. The second strip 53 in this example extends over the carriage 40 substantially under the first strip 52.

The second strip 53 is pivotally mounted on the carriage 40 pivot between a lowered position in which the second strip 53 lies substantially in line with the remainder of the base 41 and a raised position in which the second strip 53 extends transversely relative to the base 41 towards the ceiling of the device 1. By way of example, the second strip 53 is mounted to move between the lowered position and the raised position by a pivoting movement about the axis D. This pivoting movement is preferably motor driven.

The second strip 53 is preferably shaped as a suction bar having suction holes that are naturally arranged to face the sheath when the second strip 53 is in the lowered position.

This makes it possible to press the sheath as well as possible against the second strip 53 when preparing the terminal end of the sheath, thereby making it easier to connect the sheaths together, as explained below.

The control member 25 controls the pivoting movement about the axis D of the second strip 53 and also its suction from the vacuum pump.

The carriage 40 itself preferably serves to enable the lips of the new sheath to have adhesive applied internally thereto.

For this purpose, in this example the carriage 40 has a first adhesive applicator system constituted by a first adhesive dispenser 54 and a second adhesive applicator system constituted by a second adhesive dispenser 55 (of which only a portion is shown in the various figures), each having a respective platform. Each platform typically extends the base 41 (along the first axis X) and is secured to said base 41 in such a manner that the first platform 56 extends on one side of the base 41 and the other platform 57 extends on the other side of the base 41.

Advantageously, the presence of the two dispensers 54 and 55 and the way they are arranged makes it possible to apply adhesive more quickly to the lips of the new sheath. Furthermore, this also makes it possible to shorten the length of the device 1 (along the first axis X).

In a particular embodiment, the dispensers 54 and 55 are shaped in such a manner that each dispenser 54, 55 can act on its own to apply adhesive internally simultaneously to both lips of the new sheath.

Preferably, each dispenser 54, 55 is arranged in such a manner that a single roll of adhesive makes it possible simultaneously to apply adhesive to the insides of both lips of the new sheath.

Since the two dispensers 54 and 55 are identical, only one dispenser 54 is described herein, the description naturally applying equally to the other dispenser 55.

In a particular embodiment, the dispenser 54 operates on the same principle as a roller corrector.

Thus, the dispenser 54 is not motor driven. As a result of the way the carriage 40 and the dispenser 54 are arranged, it is merely the movement of the carriage 40 relative to the new sheath that leads to adhesive being applied to the new sheath.

The dispenser 54 typically has a first spool 58 having a roll of adhesive mounted thereon in order to unreel the roll of adhesive, and a second spool 59 for reeling in the ribbon that supports the roll of adhesive, the two spools 58, 59 being arranged on the platform 56 so as to be movable in rotation the platform 56 about axes of rotation that are parallel to the third axis Z.

The dispenser 54 also has an applicator cylinder 60 for applying the adhesive from the adhesive roll that is designed to come into contact with the inside faces of the lips of the initial end of a sheath. The applicator cylinder 60 is arranged on the platform 56 so as to be movable in rotation on the platform 56 about an axis of rotation e parallel to the third axis Z.

Thus, the dispenser 54 is arranged so that, in operation, the roll of adhesive is positioned on the first spool 58 and the corresponding support ribbon passes from the first spool 58 to the applicator cylinder 60 going round said applicator cylinder 60 prior to being wound onto the second spool 59. Furthermore, the dispenser 54 is arranged so that the width of the support ribbon of the roll of adhesive extends parallel to the third axis Z.

In order to facilitate applying the adhesive carried by the support ribbon, the dispenser 54 in this example includes tensioner wheels. A first tensioner wheel 61 is thus arranged on the platform between the first spool 58 and the applicator cylinder 60, and a second tensioner wheel 62 is arranged on the platform 56 at the second spool 59. The two tensioner wheels 61 and 62 extend in the path followed by the support ribbon so as to ensure said ribbon is well tensioned.

In particular manner, a belt 63 surrounds the two spools 58 and 59 so as to synchronize their rotation, mechanically. This further facilitates applying adhesive on the inside faces of the lips at the initial end of the new sheath.

In particular manner, the dispenser 54 has a return finger 64 arranged on the platform 56 at the applicator cylinder 60 and the first tensioner wheel 61 so as to cause the support ribbon to advance relative to the applicator cylinder 60, at the end of applying adhesive to the lips of an initial end. As a result, it is ensured that adhesive is present on the applicator cylinder 60 for the next adhesive application sequence. By way of example, the return finger 64 can be actuated automatically or else mechanically by a spring.

Typically, the dispenser 54 is mounted to move relative to the base 41 between an application position in which the applicator cylinder 60 is in contact with the lips at the initial end of a sheath (i.e. substantially level with the two facing suction bars 23, 24 of the frame 10) and a retracted position in which the dispenser 54 is offset a little towards the rear of the base 41 so as to provide a small offset between the applicator cylinder 60 and the suction bars 23, 24 of the frame 10. By way of example, the dispenser 54 is mounted to move in translation relative to the base 41 between these two positions along an axis parallel to the second axis Y.

Thus, once adhesive has been placed on the lips, the dispenser 54 can shift rearwards so as to make it easier to retract the lips from the applicator cylinder 60 on which the support ribbon of the adhesive roll is pressed.

Alternatively, the dispenser 54 is fastened rigidly to the base 41. In another alternative, only a portion of the dispenser 54 (e.g. the applicator cylinder 60) is mounted to be movable relative to the base 41 in order to provide this retraction movement of the applicator cylinder 60.

Figure 8:
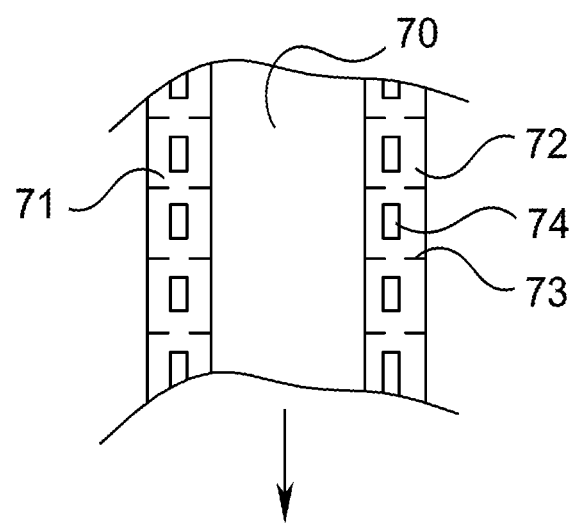
FIG. 8 is a diagrammatic view of a portion of a roll of adhesive used in the device shown in FIG. 2.

With reference to FIG. 8, the roll of adhesive is described in greater detail. The roll of adhesive carries double-sided adhesive so as to provide internal application of adhesive on both sheaths.

The roll of adhesive is preferably shaped in such a manner that the ribbon supporting said roll of adhesive comprises over the entire length of the roll of adhesive a central zone 70 that is without adhesive (represented by an arrow) and two margin zones 71 and 72 that are covered in adhesive on either side of said central zone 70. Thus, over the width of the support ribbon (and for the entire length of the roll of adhesive) there are to be found in succession one margin zone 71 with adhesive, a central zone 70 without adhesive, and another margin zone 72 with adhesive.

This makes it easier to apply adhesive to the inside faces of the lips of the initial end of a sheath since each margin zone comes into contact with a respective one of said inside faces.

Preferably, the margin zones 71 and 72 are precut at regular intervals along the length of the roll of adhesive. For example, this precutting is provided by microcuts formed at regular intervals in the adhesive along the roll of adhesive. Precutting is defined in such a manner that two precut lines 73 (only one of which is given a reference) together define a length of adhesive corresponding to the length of a lip of a sheath that is to have adhesive applied thereto.

This makes it easier to detach the margin zones 71, 72 at the microcut, thereby further facilitating retraction of the applicator cylinder 60 from the lips for receiving adhesive. In particular, the connection device in this particular embodiment of the invention thus does not need a cutter tool dedicated to cutting the adhesive.

Preferably, the roll of adhesive is also shaped so that each of the margin zones 71, 72 has markers 74 (only one of which is referenced in FIG. 8) that are arranged at regular intervals along the length of the corresponding boundary zone in order to detect a connection between two flat tubular sheaths. By way of example, the markers may be elements made of metal.

In a variant, only one of the two margin zones 71, 72 has a succession of markers 74 along its length.

The roll of adhesive is shaped so that each portion of adhesive defined between two precut lines 73 includes a marker 74.

With reference to FIGS. 9a to 9i, there follows a detailed description of how the above-described device is used.

Figure 9A:
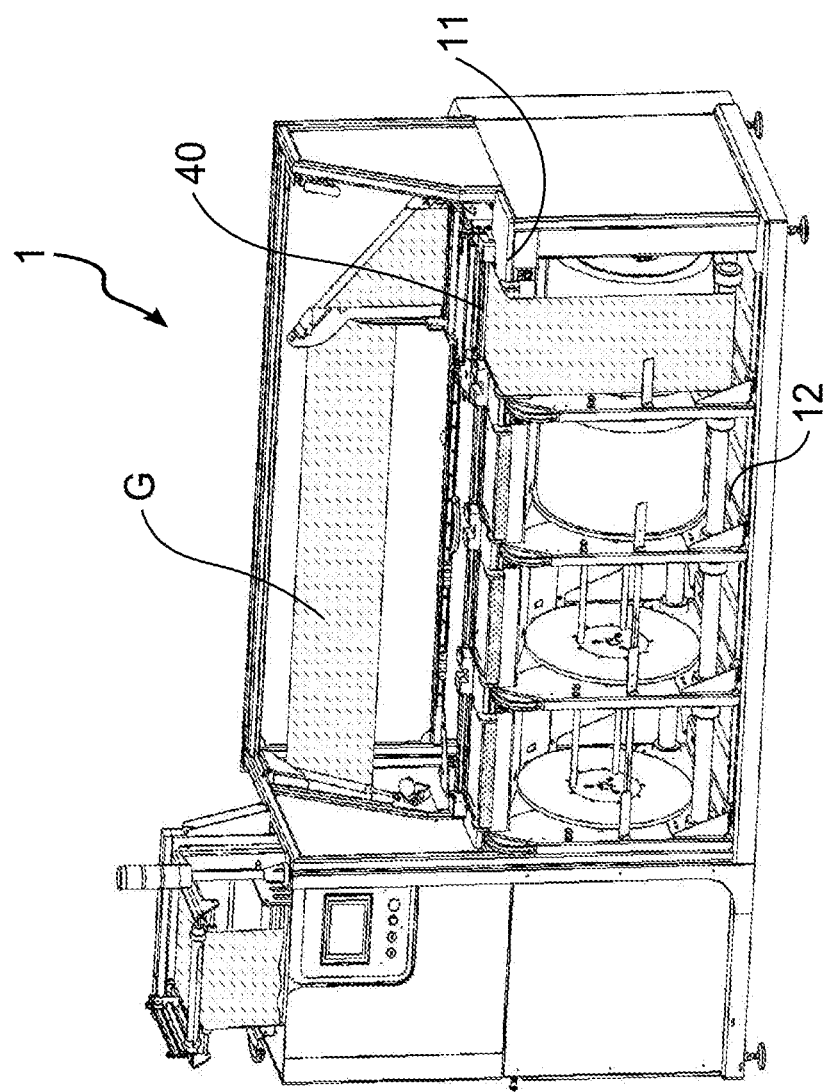

FIG. 9a shows the device when no connection procedure has been launched.

Only one sheath G is being unwound from the magazine 12 to the outlet from the device 1 and in this example it passes via the connection table 11 and the carriage 40.

The other compartments are empty or contain sheaths waiting to be connected.

It is then possible for an operator to work on the magazine 12 in order to prepare new initial sheath ends.

As can be seen in FIG. 9b, by way of example, the operator arranges a new reel of a sheath H in an empty compartment, e.g. 13a, by placing the reel on the spindle and then arranging the holder disk against the reel.

The operator then places the top suction bar 23 of the blocker 22a (that is associated with the compartment 13a in which the reel has been placed) in the spaced-apart position.

Thereafter, the operator pulls the initial end of the sheath H from the compartment 13a, winds it around the first deflector roller, the second deflector roller 17a, and the third deflector roller 18a so as to place the initial end on the connection table 11 between the two suction bars 23 and 24 of the blocker 22a.

The operator then replaces the top suction bar 23 in the blocking position so as to block the initial end between the two suction bars 23 and 24 relative to the frame 10.

The operator then engages the cutter appliance 30 on the connection table 11 via the snap-fastener means 28a associated with the blocker 22a and then actuates the additional handle 34 so as to cut off the initial end, thereby forming the initial end lips.

The operator may advantageously make use of the rule 26a and/or the marker 27a on the connection table 11 in order to position the initial end in predetermined manner relative to the cutter appliance 30 so that the initial end is cut at a predetermined position (in the travel direction of the sheath H). The operator can also make use of the protection mat 29a for this purpose.

Figure 9C:
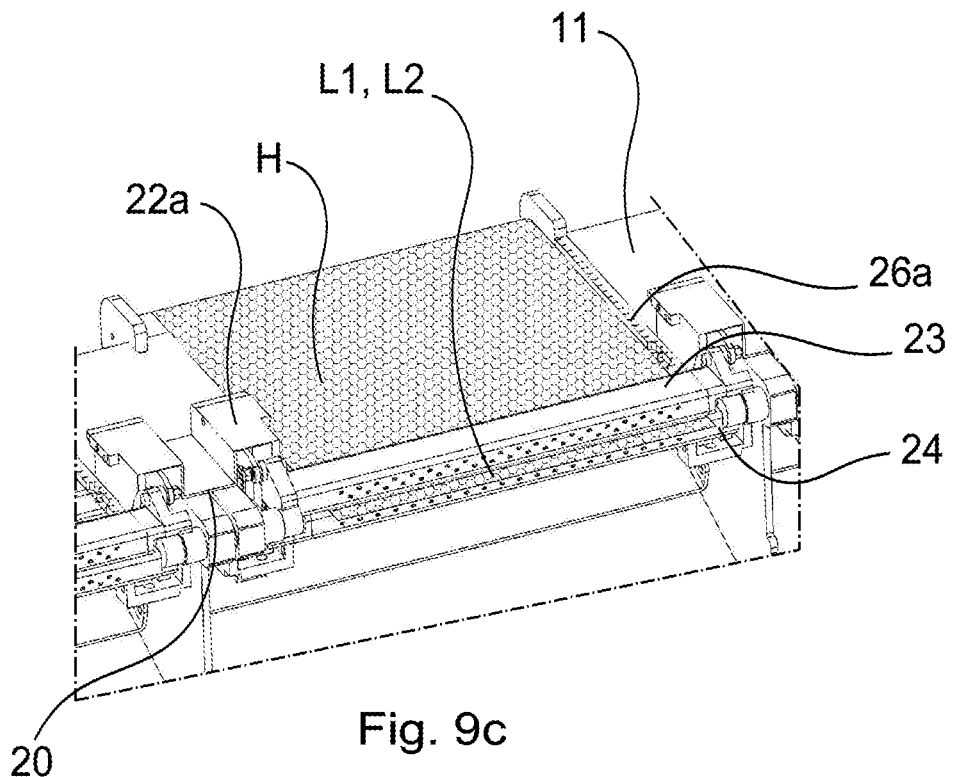

As shown in FIG. 9c, the cutter appliance 30 is then withdrawn and the operator places the top suction bar 23 in the spaced-apart position so as to position the initial end correctly once more in appropriate manner relative to the connection table 11 prior to placing the top suction bar 23 once more in the blocking position in order to block the initial end between the two suction bars 23 and 24. Typically, the operator arranges the initial end in such a manner that only the lips L1 and L2 of the initial end extend beyond the blocker 22a and thus the connection table 11 relative to the second longitudinal edge 20 of the connection table 11.

Given the way the initial end has been cut, the two lips L1 and L2 are thus arranged one above the other and they are pressed one against the other.

The sheath H is then ready to be connected to the sheath G that is being unreeled.

It is thus possible to prepare the various reels in the magazine 12 in this way without impeding the travel of the reel that is being unreeled and without any need to stop the movement of the sheath G that is being unreeled.

Thereafter, on detecting the end of the reel that is moving, the control member 25 cuts off the power supply to the actuator roller 44 and to the drive reel 50 of the carriage 40 so that the reel stops unreeling. The presence of the accumulator 2 in the device 1 nevertheless enables the machine 3 to continue operating normally without interruption for the time required to make the connection.

The unreeling of the reel is stopped so that the reel stops at a predetermined position in the carriage 40.

Figure 9D:
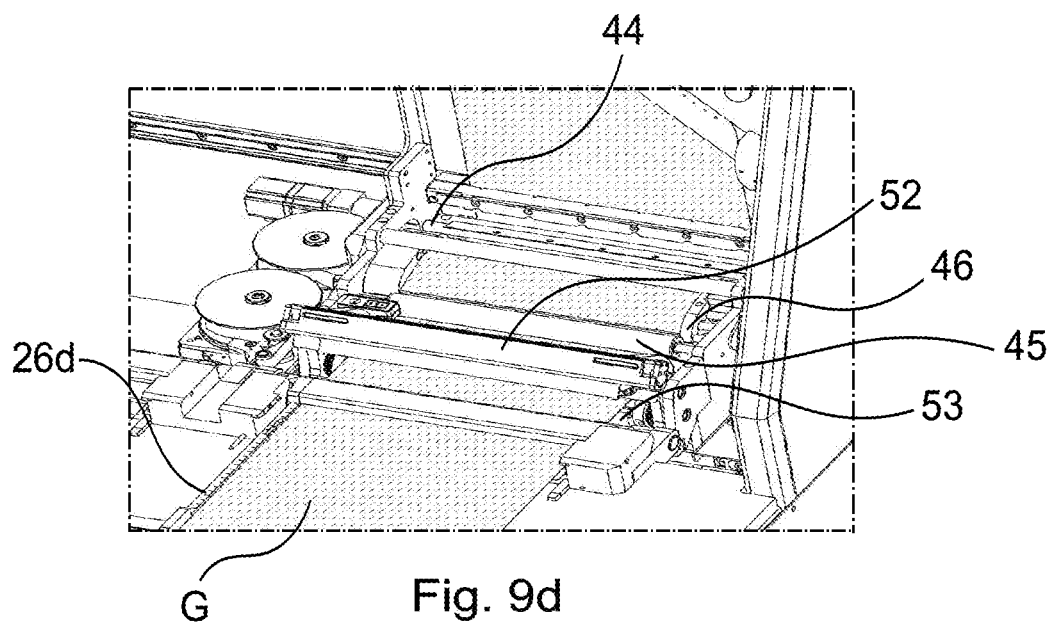

With reference to FIG. 9d, the second suction strip 53 of the carriage 40 is controlled to suck the sheath G that is being unreeled so as to press the sheath G again the second suction strip 53.

The blade of the first strip 52 of the carriage 40 then cuts the sheath G so as to separate the sheath G present in the carriage 40 from the remainder of the corresponding reel G' present in the magazine 12. The second suction strip 53 serves advantageously to hold the sheath G in place during cutting and then to keep the terminal end of the sheath G in place once it has been cut off.

Figure 9E:
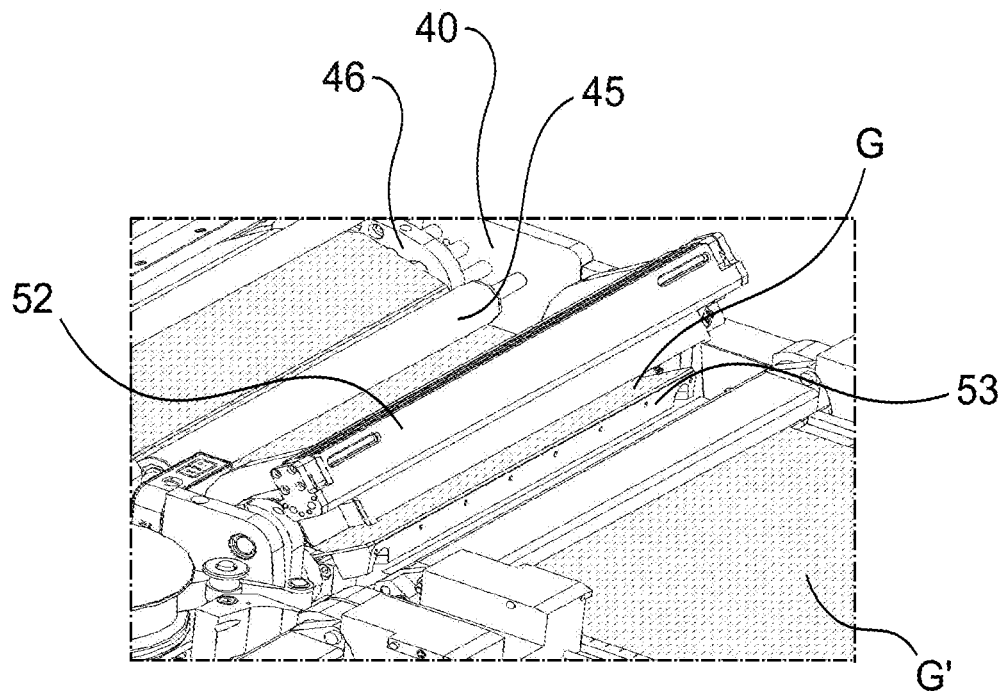

As can be seen in FIG. 9e, the second suction strip 53 is then raised into its raised position so as to enable the terminal end to be raised and thus avoid said terminal end impeding movement of the carriage 40 when the carriage 40 is taken to one of the initial sheath ends that is on standby.

Figure 9F:
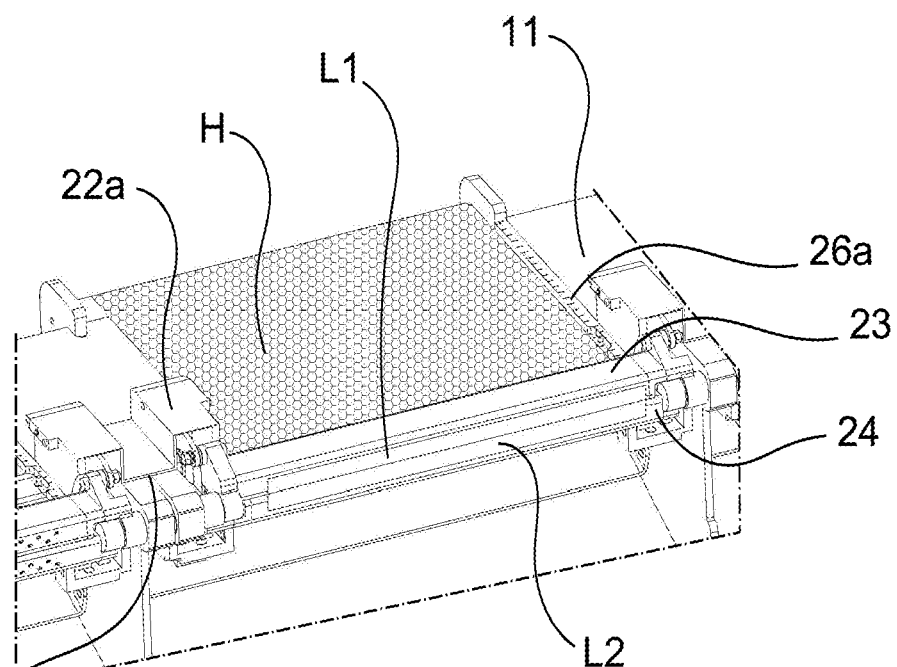

With reference to FIG. 9f, the various suction bars of the connection table 11 are then operated. At the suction bars between which the initial sheath ends are inserted, this suction moves the lips of a given initial end apart from each other. Specifically, given the arrangement of the initial ends, the suction via the suction bars presses the top lip L1 of each initial end against the top suction bar 23 of the associated blocker and presses the bottom lip L2 of each initial end against the associated bottom suction bar 24.

It should be observed that the shape of the initial end (i.e. its lips) makes it easier to open.

Opening all of the lips of the initial ends of the sheaths on standby thus avoids said initial ends impeding the movement of the carriage 40 while the carriage 40 is being taken to one of these initial ends.

Figure 9G:
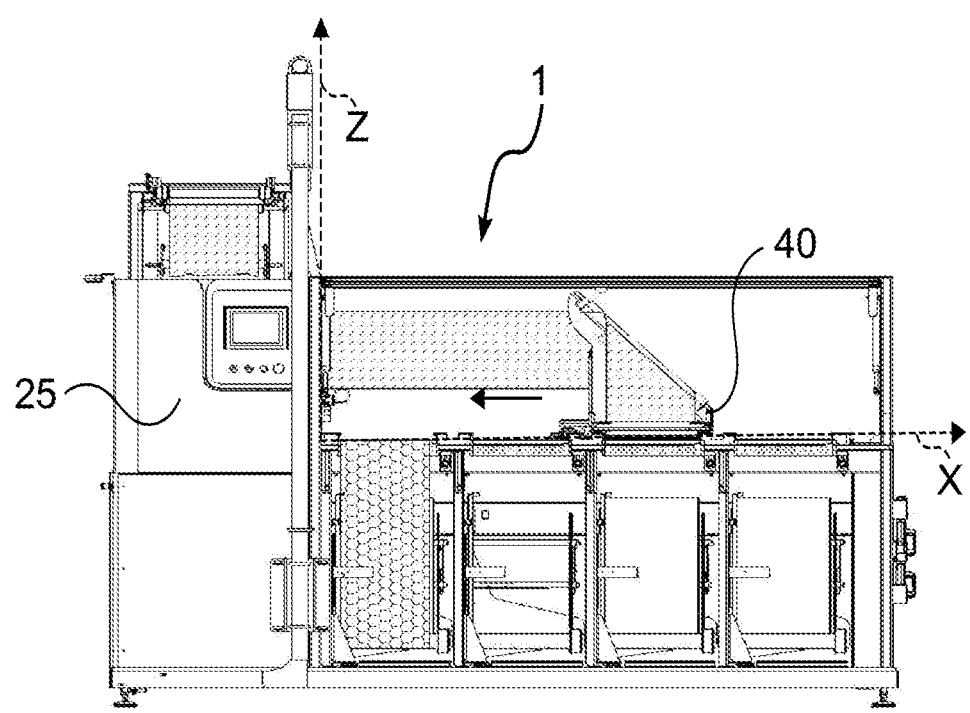

With reference to FIG. 9g, the carriage 40 is then moved along the first axis X with the control member 25 determining which initial end on standby is to have the carriage 40 positioned thereat. The movement of the carriage 40 is represented by an arrow.

During the movement of the carriage 40, use is advantageously made of the advance and retreat movements of the dispensers 54, 55 relative to the remainder of the carriage 40 to apply adhesive only to the inside of the initial end intended by the control member 25.

At the intended initial end, the upstream dispenser of the carriage 40 (upstream in the sliding direction of the carriage 40), in this example the dispenser 54, is thus in its application position. Because the lips are opened, merely pressing the associated applicator cylinder 60 carrying the rolls of adhesive and moving the dispenser 54 relative to said lips along the first axis X serves to deposit the adhesive on both lips simultaneously.

The lips L1, L2 thus both have adhesive applied thereto respectively from the rolls of adhesive A1, A2.

The carriage 40 continues its sliding movement along the first axis X until the terminal end is in line with the initial end.

It should be observed that in a given movement in translation of the carriage 40, adhesive is applied to the initial end before the terminal end is brought to face the initial end. This makes it easier to connect the two ends together by limiting relative movement within the device 1, and in particular between the carriage 40 and the frame 10.

Figure 9H:
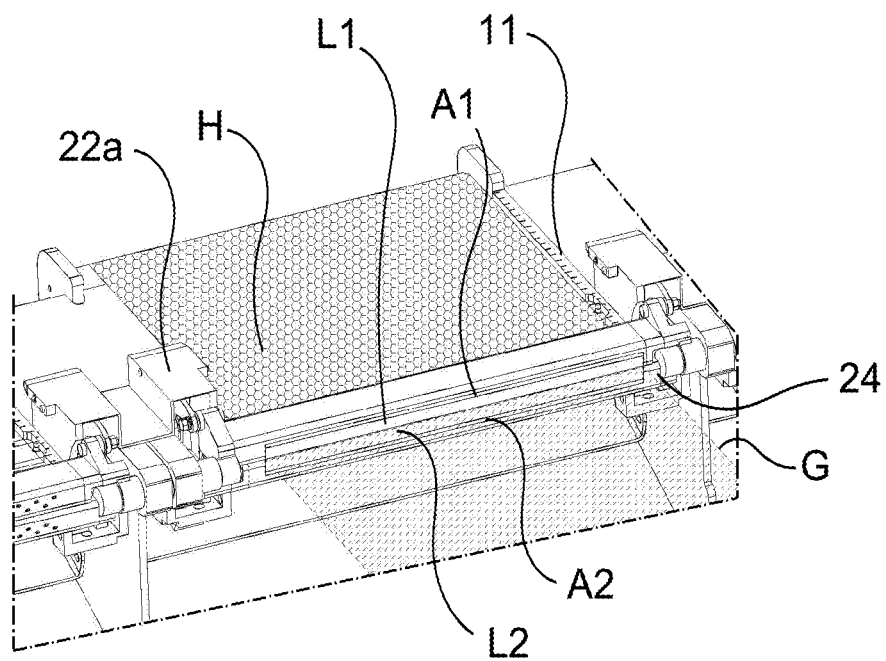

The second suction strip 53 of the carriage 40 is then put into its lowered position in order to lower the terminal end in register with the initial end. The terminal end is then arranged between the two open lips of the initial end, as shown in FIG. 9h (the carriage 40 being omitted for greater visibility and the old sheath G being represented merely by dotted lines, likewise to make the figures easier to read).

Figure 9I:
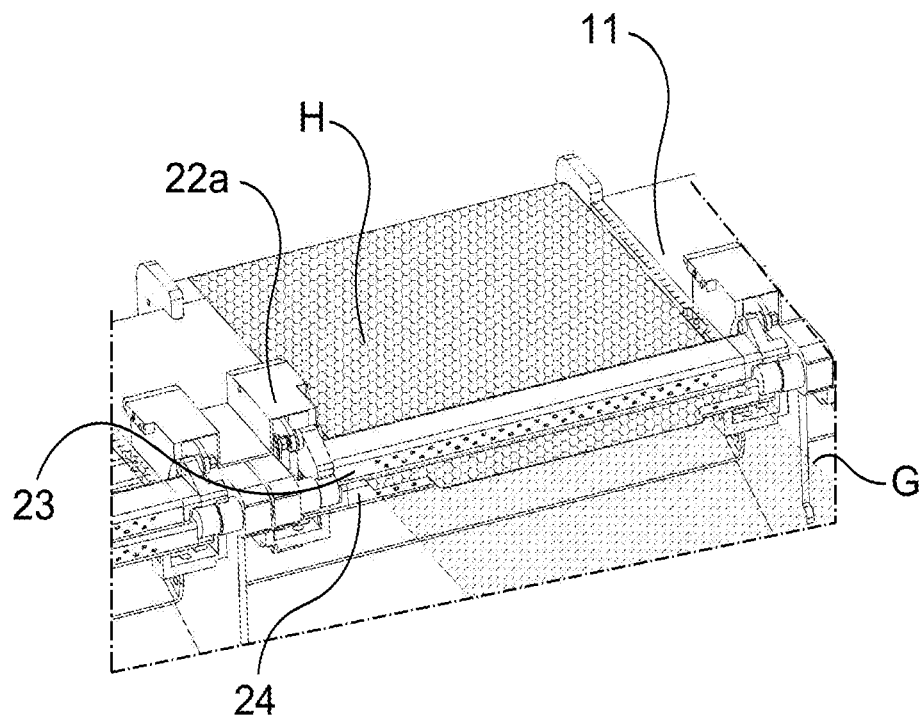

With reference to FIG. 9i, the two suction bars 23, 24 of the blocker 22a are then tilted into the closing position.

This causes the lips of the initial end to close onto the terminal end, thereby sealing the two sheaths G and H together from the inside.

As a result, it may be observed that the base 41 is movable relative to the frame solely by moving in translation (specifically along the first axis X). The carriage 40 in this example also has a second strip 52 that is mounted to move relative to the base 41, enabling it to move the terminal end facing the initial end in pivoting only. The configuration of the carriage 40 is thus very simple, and in particular the configuration of the base 41 of the carriage is very simple for enabling the two sheaths to be connected together.

It should be observed that two orifices are present in the sides of the connection as a result of the cutout shape of the initial end. These orifices serve advantageously to facilitate opening the junction and the new sheath when the new sheath passes through the shaper 4. This also serves to make the junction easier to detect in the machine 3 so as to be able to discard the junction without placing it on one of the traveling objects O. Furthermore, the marker(s) carried by the adhesive at the connection between the two sheaths also enable the junction to be detected in the machine 3 in order to be able to discard the junction without placing it on one of the traveling objects O.

Thereafter, suction in said suction bars 23, 24 and also in the second suction strip 53 of the carriage 40 is stopped.

It is then possible to restart the drive roller 44 and the drive wheel 49 of the carriage 40 so as to unreel the new reel that has thus been connected to the old reel.

A device 1 is thus proposed that enables connection to be made effectively and quickly. In particular, the presence of adhesive on the lips of the initial end suffices to connect it to the terminal end, and the carriage 40 makes only one sliding movement for applying adhesive and for causing the two sheaths to face each other.

It should be observed that with the device 1 as described above, it is relatively simple to engage the two ends with each other, since it suffices to manage the relative longitudinal position between the carriage 40 and the blocker associated with the new sheath (along the first axis X) so as to cause the sheaths to face each other.

The invention is not limited to the above description but on the contrary covers any variant coming within the ambit defined by the claims.

In particular, although in this example the carriage carries directly the dispenser for applying adhesive to the initial end prior to bringing the terminal end to face it, the carriage could be arranged only to bring the two ends so that they face each other and/or could be arranged only to apply adhesive to the first end. For example, if the carriage serves only to move the terminal end, the device could include other means for applying adhesive to the lips, such as for example tilting pincers applying adhesive to the lips after they have been opened and before the carriage is moved. For example, if the carriage is arranged only to apply adhesive to the initial end, some other element, e.g. another carriage could serve to move the two ends so that they face each other.

Furthermore, the carriage may be arranged to perform movements for bringing the two sheaths face to face other than a sliding movement of the base relative to the frame.

Although in this example the adhesive is applied naturally, merely by the carriage moving relative to the lips that are to receive adhesive, the dispenser of the carriage could on the contrary be motor driven for depositing adhesive.

Although in this example a single roll of adhesive serves to apply adhesive to both lips, it is possible to have recourse to rollers, adhesives, and/or in general manner adhesive-applicator systems for applying adhesive simultaneously or otherwise to the two lips that are different from the above-described adhesive dispensers, e.g. such as an adhesive applicator system that deposits liquid glue on the lips.

Instead of using a cutter appliance that is movable on the frame, it would be possible to use a respective cutter appliance that is associated with each blocker and that is not movable from one blocker to another.

It is also possible not to have such a cutter appliance. It is also possible not to have a new step of positioning the sheath once its initial end has been cut. For example, the sheath may be pulled until a stationary reference or a sensor of the device comes up to an index provided for this purpose on the initial end of the sheath, with the sheath then being cut in this position and then being directly in the appropriate standby position.

Although in this example the accumulator forms a part of the device, the device need not have any accumulator and it could optionally be connected to an accumulator external to the device.

Naturally, the device could include elements other than those described. For protection purposes, the device could thus include a protective cover serving to isolate the carriage and the rails on which the carriage slides from the operator. The operator could then have access to a portion only of the frame or to all of it in order to be able to change reels. The adhesive dispensers could in addition or as a replacement also include a protective housing for isolating the roll of adhesive from the outside. The housing could naturally be removable so that an operator can open it and change the roll of adhesive.

In order to make the sheath easier to guide while it is traveling, the various rollers and backing rollers, deflection rollers, actuator rollers, secondary rollers, etc. of the device could all (or only some of them) include a respective wheel arranged on the associated roller so as to be positioned to be in contact with one of the edges of the sheath. It should be observed that it is easy to modify the positions of the wheels so as to adapt to a sheath of some other width, thereby making the installation modulatable.

The device could include one or more cutting templates, e.g. associated with each mat blocker in order to further facilitate placing the end of the sheath in a predetermined position for cutting the initial end and/or for placing the initial end on standby for connection with the sheath that is being unreeled.

Other suction elements could be associated with the frame and/or the carriage. For example, the connection table should be shaped so as to present suction holes in its second longitudinal edge in order to press the sheath firmly against the suction table when making the junction with the sheath that is being unreeled.

It could be the carriage that carries the blocker and the corresponding opening means. It would thus be possible to apply adhesive to the inside face of the terminal end in order to close it on the initial end. By way of example, an adhesive dispenser could be arranged at the end of the frame and the carriage could begin by going thereto in order to apply adhesive to the lips at the end of the sheath that it is carrying prior to placing said sheath in a position facing a new sheath.

The invention claimed is:

1. A device for connecting together two flat tubular sheaths, the device including:
   a blocker for blocking one end of a first sheath, the blocker having opener for opening an end of the first sheath; and
   an adhesive applicator system for applying adhesive to the inside of the open end of the sheath;
   the blocker being arranged, once adhesive has been applied to the end of the first sheath, to authorize closure of the end of the first sheath on an end of the second sheath.

2. The device according to claim 1, wherein the adhesive-applicator system includes an adhesive dispenser.

3. The device according to claim 1, wherein the device includes a frame, the blocker being arranged on the frame.

4. The device according to claim 1, wherein the device includes a carriage for moving an end of the second sheath relative to the first sheath.

5. The device according to claim 4, wherein the carriage includes a base for supporting the second sheath, the base being arranged in the device in such a manner as to be movable in translation relative to a frame of the device with movement in translation only.

6. The device according to claim 4, wherein the carriage carries the adhesive-applicator system in order to apply adhesive to the end of the first sheath.

7. The device according to claim 6, wherein the carriage has two adhesive-applicator systems arranged at opposite ends of the carriage.

8. The device according to any one of claim 4, wherein the carriage includes an extension carrying a motor-driven drive wheel, the carriage is thus arranged in such a manner that when the carriage is in register with the blocker, the drive wheel is situated in register with a reel formed by the first sheath so as to be able to drive the reel in rotation either directly or via an element constrained to rotate with the reel.

9. The device according to claim 7, wherein the carriage includes means for preparing the end of the second sheath.

10. The device according to claim 9, wherein the means for preparing the end of the second sheath include a cutter member for cutting the end of the second sheath.

11. The device according to claim 9, wherein the means for preparing the end of the second sheath include a second strip movably mounted on the carriage to move between a lowered position in which the strip lies substantially extending the remainder of the carriage and a raised position in which the second strip extends transversely towards a ceiling of the device.

12. The device according to claim 11, wherein the strip is shaped as a suction bar.

13. The device according to claim 1, wherein the opener includes two suction bars arranged one above the other and between which the end of the first sheath is to be inserted.

14. The device according to claim 13, wherein each of the two suction bars is movably mounted relative to a frame of the device to move between:
   a closing position in which the two bars are arranged so that suction holes in one of the bars face suction holes in the other bar; and
   a blocking position in which the two bars are arranged so that the suction holes of both of the bars are oriented towards an outside of the blocker.

15. The device according to claim 14, wherein at least one of the bars is also mounted to move relative to the frame with additional movement so as to be movable between:
   a spaced-apart position in which said bar is offset from the other bar; and
   the standby position in which the two suction bars are placed one against the other.

16. The device according to claim 1, further including a cutter appliance for preparing the end of the first sheath, the cutter appliance including snap-fastener means suitable for co-operating with corresponding snap-fastener means of a frame of the device.

17. The device according to claim 16, wherein the cutter appliance includes a slot and a movable blade that is movable relative to said slot, the slot being arranged in such a manner as to present a rectilinear central portion that is extended at both ends by symmetrical steps.

18. The device according to claim 1, wherein a frame of the device includes a magazine for storing reels, the magazine having drawers mounted to slide relative to the frame and each carrying one reel.

19. A method of connecting together two flat tubular sheaths using the device according to claim 1, the method comprising the following successive steps:
   blocking one end of a first sheath with the blocker;
   opening the end of the first sheath with the blocker;
   applying adhesive to the inside of the end of the first sheath with the adhesive applicator; and
   closing the end of the first sheath on an end of the second sheath with the blocker.

20. A device for connecting together two flat tubular sheaths, the device including:
   a blocker for blocking one end of a first sheath, the blocker having opener for opening an end of the first sheath; and
   an adhesive applicator system for applying adhesive to the inside of the open end of the sheath;
   the blocker being arranged, once adhesive has been applied to the end of the first sheath, to authorize closure of the end of the first sheath on an end of the second sheath,
   wherein the device includes a carriage for moving an end of the second sheath relative to the first sheath,
   wherein the carriage carries the adhesive-applicator system in order to apply adhesive to the end of the first sheath, and
   wherein the carriage is arranged so that when the carriage moves the end of the second sheath relative to the first sheath, movement of the carriage leads the adhesive to be applied to one of the sheaths.

* * * * *